June 13, 1933.   A. J. PIESZAK   1,914,287
AUTOMOBILE SAFETY WINDSHIELD SASH
Filed May 16, 1932
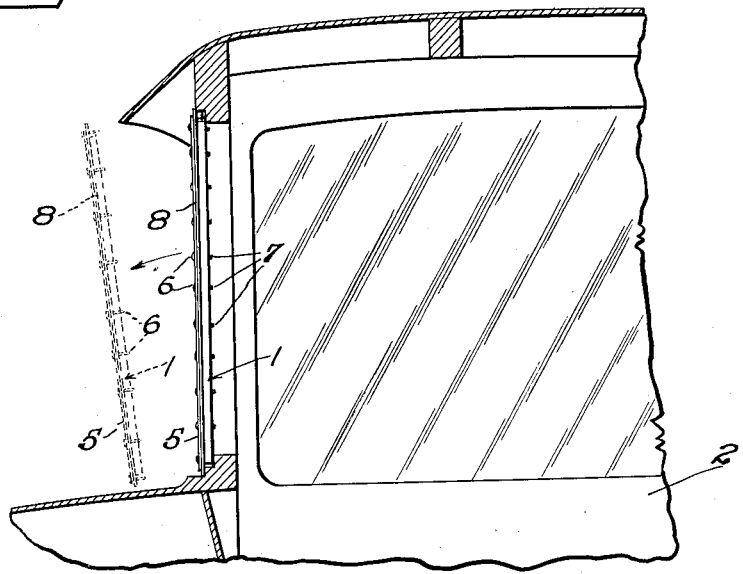
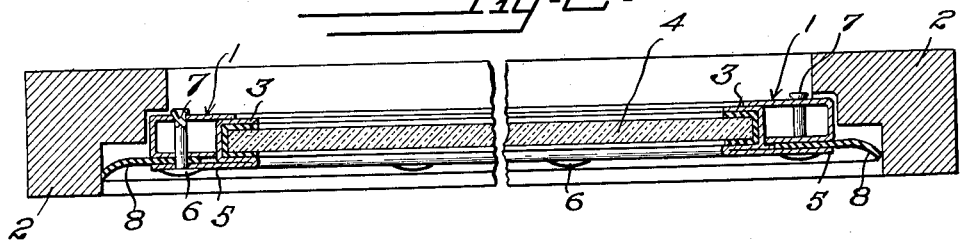
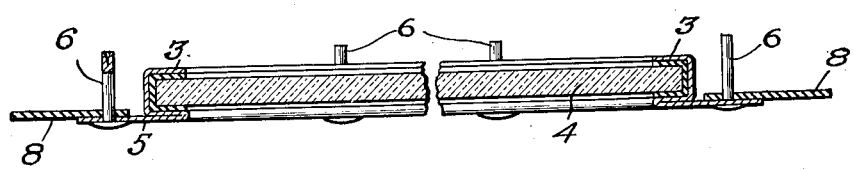
*Anthony John Pieszak*
INVENTOR
BY *Victor J. Evans & Co.*
ATTORNEY
WITNESS
*H. J. Meader*

Patented June 13, 1933

1,914,287

UNITED STATES PATENT OFFICE

ANTHONY JOHN PIESZAK, OF DUNKIRK, NEW YORK

AUTOMOBILE SAFETY WINDSHIELD SASH

Application filed May 16, 1932. Serial No. 611,655.

This invention relates to safety windshields for motor vehicles and has for the primary object, the provision of a device of the above stated character which will be releasable from a vehicle in case of a collision so as to obviate the occupants of the vehicle being thrown against the windshield or injured thereby or cut by the glass of the windshield.

With this and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary vertical sectional view illustrating a windshield mounted on a vehicle in accordance with my invention.

Figure 2 is a sectional view showing the windshield secured in a mounting carried by the vehicle.

Figure 3 is a sectional view illustrating the windshield removed from the mounting.

Referring in detail to the drawing, the numeral 1 indicates a mounting in the form of a channeled frame positioned in recesses formed in the vehicle body 2 and suitably secured therein. The mounting 1 forms a seat for a windshield frame 3 of channel iron construction carrying the usual transparent panel 4. The windshield frame has formed integrally therewith attaching strips 5 apertured to receive rivets 6. The rivets 6 extend through aligned openings in the mounting 1 and are slightly flared as shown at 7 retaining the windshield frame to the mounting. Secured to the strips 5 by the rivets 6 are flexible strips 8 adapted to engage the vehicle body 2 to prevent the entrance of weather elements into the vehicle about the mounting and the body of the vehicle.

The flare of the rivets 7 is sufficient to retain the windshield frame in seated engagement with the mounting 1 until the vehicle is in a collision with some obstacle, the impact of which will cause the rivets to withdraw from the mounting freeing the windshield and allowing the same to fall outwardly as shown in Figure 1 so that should the occupants of the vehicle be thrown forwardly by the impact they will not contact or engage with the glass thereof, consequently obviating injury, now frequently caused by the occupants striking the windshield or the glass thereof and receiving fractures or bad cuts from broken glass.

While I have shown and described the preferred embodiment of my invention, it will be understood that minor changes in construction, combination and arrangement of parts may be made without departing from the spirit and scope of my invention, as claimed.

Having thus described my invention, what I claim is:—

A safety windshield comprising a channeled mounting fixed to the body of a motor vehicle and having certain walls thereof projecting beyond its other walls to form a seat, a channeled frame located in the seat, a transparent panel mounted in the frame to close the latter, strips integral with the outer faces of the frame and overlying the mounting, rivets extending through the strips and mounting and having flared ends to prevent withdrawal of the rivets until subjected to force developed by an impact of the vehicle with an object and acting to free the frame from the mounting, and flexible strips located between the first strips and the mounting and secured to the latter by the rivets and projecting beyond the mounting to engage the body of the motor vehicle to exclude weather elements.

ANTHONY JOHN PIESZAK.